United States Patent [19]

Koch et al.

[11] Patent Number: 4,999,108

[45] Date of Patent: Mar. 12, 1991

[54] FILTER ELEMENT WHICH CONDUCTS STATIC ELECTRICITY

[75] Inventors: Paul Koch, Obersursel/Taunus; Klaus Belz, Bad Homburg, both of Fed. Rep. of Germany

[73] Assignee: Faudi Feinbau GmbH, Obersursel/Taunus, Fed. Rep. of Germany

[21] Appl. No.: 352,761

[22] Filed: May 2, 1989

[30] Foreign Application Priority Data

Jun. 1, 1988 [DE] Fed. Rep. of Germany ....... 3818595

[51] Int. Cl.$^5$ ............................................. B01D 46/50
[52] U.S. Cl. ................................. 210/243; 210/416.5; 210/440; 210/443; 210/497.2; 55/DIG. 39; 428/929
[58] Field of Search ........... 55/DIG. 39; 210/DIG. 5, 210/243, 440, 443, 748, 416.5; 428/929

[56] References Cited

U.S. PATENT DOCUMENTS

| 3,186,551 | 6/1965 | Darhauf | 210/243 |
| 3,323,649 | 6/1967 | Rosaer | 210/243 |
| 3,870,637 | 3/1975 | Miyoshi et al. | 210/243 |
| 4,382,866 | 5/1983 | Johnson | 210/748 |

FOREIGN PATENT DOCUMENTS 1062675  8/1959  Fed. Rep. of Germany .
2126080  8/1980  Fed. Rep. of Germany .
3325526  4/1985  Fed. Rep. of Germany .

OTHER PUBLICATIONS

Article: "Crystal Clear", Facet Series #8, API Bulletin 1581, 2nd Ed., (3 pgs.).

Primary Examiner—Richard V. Fisher
Assistant Examiner—Wanda L. Millard
Attorney, Agent, or Firm—Burns, Doane, Swecker & Mathis

[57] ABSTRACT

A filter element comprises a perforated metal tube on outer and inner sides of which filter layers are disposed. A plastic terminal disk 4 is disposed at an axial end of the tube and includes a metal fastening screw. A wire is embedded in the terminal disk and electrically connects the support tube with the fastening screw so that an electrical charge taken up from the liquid to be filtered is conducted away through the wire.

8 Claims, 1 Drawing Sheet

FILTER ELEMENT WHICH CONDUCTS STATIC ELECTRICITY

BACKGROUND OF THE INVENTION

The invention concerns a filter element, in particular a coalescence element of the type comprising a metallic, perforated support tube, electrically nonconducting inner and outer filter layers located on internal and external sides of the support tube, and a plastic terminal disk into which a metal fastening screw is set.

Filter elements used to filter out solid particles and/or water from a liquid (such as automotive fuel) are known for example from German Patent No. 21 26 080. In the liquid flowing through the filter layers, in particular layers of hydrocarbons, a static electric charge is generated, which must be removed by way of the metallic parts of the filter element. Since the perforated support tube usually is made of metal, it is able to conduct the electric charge from the liquid.

The electric charge can be conducted via the terminal disk to a center spindle carrying the filter element or a metal fastening spider with which all of the end disks of the filter elements of a separator are connected. This requires that the end disks be made of metal and that an electrical connection be established between the support tube and the metal terminal disk. It is known to insert for this purpose a radially acting spring (for example, German Patent No. 33 25 526) into the end of the metal support tube, whereby an electrical connection is established to additional external and internal tubes, one of which is, in turn, connected electrically with the metal terminal disk.

In order to simplify and reduce the weight of filter elements, it has been proposed to form the terminal disks of plastic. If plastic terminal disks are used (see the "Crystal Clear" prospectus of the Facet Co.), the electric charge cannot be removed by way of the terminal disk, so that the removal of the electric charge is omitted when plastic terminal disks are employed.

It is an object of the present invention to provide a filter element, in particular a coalescent element having a plastic terminal disk wherein with little manufacturing and installation effort an effective removal of the electrical charge from the support tube can be carried out.

SUMMARY OF THE INVENTION

This object is attained according to the invention in that a metal wire is embedded in the plastic terminal disk. The wire is electrically connected at its radial inner end with the fastening screw. A radial outer end of the wire projects from an axial inner surface of the terminal disk, and is electrically connected with the support tube.

The metal wire is installed during the production of the terminal disk, preferably an injection molding process, by being inserted, preferably together with the fastening screw and in electrically conducting contact with the latter, into an injection mold prior to the pouring of the molten plastic. Instead, the fastening screw could be installed in the terminal disk later, wherein the inner end of the wire would be located so as to enter into an electrically conducting contact with the fastening screw upon the insertion of the latter.

It is known, for example from German AS-1 062 675, to insert a metal reinforcing wire into the plastic terminal disk of a filter element. But in that case the wire merely serves as a reinforcement for a member against which the edges of a folded filter sheet are abutting. No metal support tube is present and the electric charge is not removed through the wires.

The radial outer end of the wire of the present invention extends at least as far as the annular contact area of the axial end of the support tube. The wire can project past that contact area. This latter position of the radial outer free end of the wire insures that during the mounting of the filter layers, i.e., during the assembly of the filter layers and support tube against the terminal disks, an electrical contact is safely established without the need to take additional measures. This is particularly important, as the axial inner surface of the support tube is no longer accessible once the terminal disk is inserted. Since any damage to the filter layers must be carefully avoided, it is a particular advantage that the electrically conducting contact between the outer end of the wire and the support tube is obtained without any additional measures.

BRIEF DESCRIPTION OF THE DRAWING

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 1:
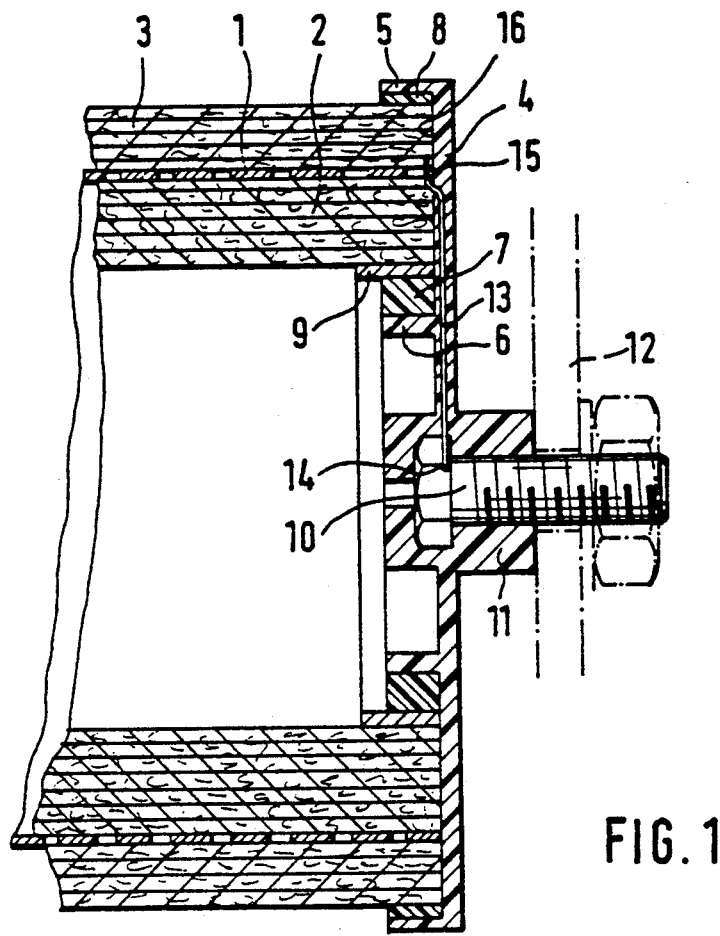
FIG. 1 is a fragmentary longitudinal view taken through a filter element according to the present invention.

The tubular filter element shown in the drawing represents a coalescence element for a solids/liquid and/or a water/liquid separator. The liquid to be filtered flows through the filter element, for example from the inside out. The filter element comprises a perforated metal support tube 1, against the inside of which an inner filter layer 2 in the form of a folded sheet of the filter material is applied.

On the outside of the perforated support tube 1 a fiber material is wound to form an outer filter layer 3. At the end of the filter element a circular terminal disk 4 is located which is formed of a plastic, for example glass fiber reinforced polyamide. The terminal disk 4 comprises an outer ring 5 and an inner ring 6 projecting from an axial inner surface 16 of the terminal disk 4, i.e., the surface facing the filter layers. Defined between the rings 5, 6 is an annular space in which the ends of the support tube 1 and the filter layers 2, 3 are embedded by means of a hardened plastic mass 7 and 8. A circular spring 9 inserted on the inside of the inner filter layer pressures the inner filter layer 2 against the support tube 1.

A metal fastening screw 10 is embedded in the center of the terminal disk, preferably by being placed in a mold before the pouring of the plastic disk material. The fastening screw projects axially outwardly away from the axial inner surface and serves to fasten the filter element. Alternatively, the screw could be attached to the disk after the latter has been formed.

As indicated in FIG. 1 by dash-and-dot lines, the terminal disk 4 may be attached by means of the fastening screw 10 onto a metal fastening spider 12 for example, which is mounted inside a metal filter housing (not shown).

Prior to the injection molding of the plastic terminal disk 4, a wire 13 is inserted into the mold. In the case where the screw is to be embedded in the terminal disk, the screw is also inserted into the mold such that a radially inner end of the wire is in electrically conducting contact with the fastening screw 10. A simple metallic contact of the fastening screw 10 and the wire end 14 mold is sufficient. Alternatively, the inner wire end 14 may be soldered or welded to the screw 10.

Figure 2:
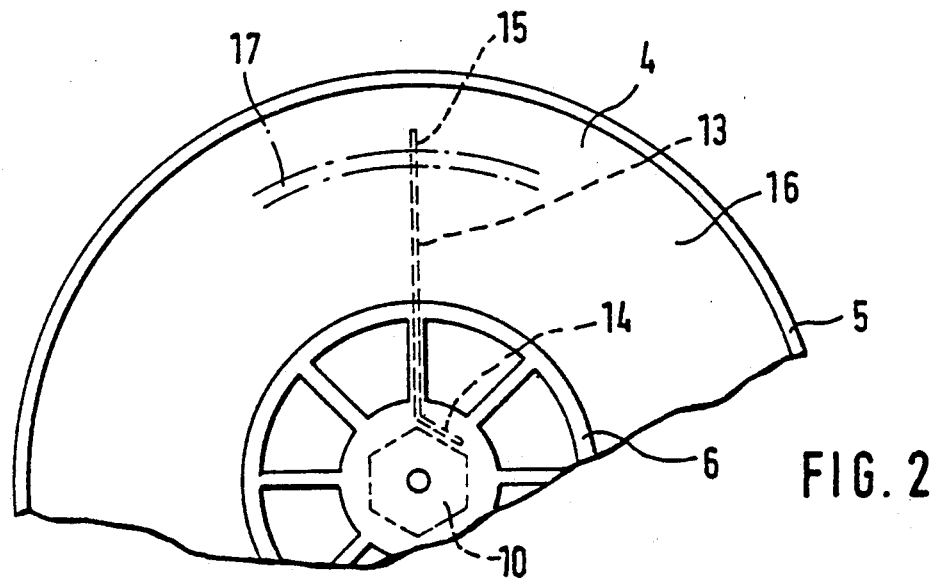
FIG. 2 is a fragmentary end view of a terminal disk of the filter element of FIG. 1.

The portion of the wire 13 located between its radially inner and outer ends is preferably oriented radially in the terminal disk 4. The radially outer end 15 projects from the axial inner surface 16 and is bent against that surface 16 in such manner that it projects radially past the annular contact area 17 (indicated by a dash-and-dot line in FIG. 2) of the axial end of the support tube 1. The support tube 1 is pressed against the axial inner surface 16 so as to be brought into an electrically conducting contact with the radially outer end 15 of the wire.

In this manner an electrical connection is established from the support tube 1, through the wire 13 to the fastening tube 10 and from there to the metal support spider 12 or the like. Any electric charge generated in the flowing liquid (for example automotive fuel) is taken up by the support tube 1 and conducted along the aforementioned path to the metal housing. The electric charge may be removed in a similar manner if the terminal disk 4 is connected with a metal center spindle, which then takes the place of the fastening screw 10.

Although the present invention has been described in connection with a preferred embodiment thereof, it will be appreciated by those skilled in the art that additions, substitutions, modifications and deletions not specifically described, may be made without departing from the spirit and scope of the invention as defined in the appended claims.

What is claimed is:

1. A filter element adapted for the filtering of a liquid containing static electricity, said filter element comprising:
   a perforated metal support tube,
   inner and outer electrically non-conductive filter layers disposed on inner and outer peripheries, respectively, of said tube for filtering the liquid,
   a plastic terminal disk having an axial inner surface mounted against axial ends of said support tube and filter layers,
   a metal fastener connected to said terminal disk and projecting therefrom, said fastener including a portion embedded in said terminal disk,
   a metal wire embedded in said terminal disk and including an exposed radial inner end electrically connected to said fastener, and a radial outer end exposed at said axial inner surface and electrically connected with an end of said support tube, said wire adapted to conduct static electricity in the liquid from said support tube to said fastener, said radial inner end of said wire being held in contact with said fastener solely by virtue of being disposed between said fastener and a surrounding portion of said terminal disk.

2. A filter element according to claim 1, wherein said radial outer end of said wire extends radially at least as far as said end of said support tube.

3. A filter element according to claim 2, wherein said radial outer end of said wire extends radially beyond said end of said support tube.

4. A filter element according to claim 1, wherein said fastener comprises a metal screw projecting axially away from said axial inner surface.

5. A filter element according to claim 1, wherein a portion of said wire extending between said radial inner and outer ends of said wire is oriented substantially radially.

6. A filter element according to claim 1, wherein said fastener extends through an axial center of said terminal disk.

7. A filter element adapted for the filtering of a liquid containing static electricity, said filter element comprising:
   a perforated metal support tube,
   inner and outer electrically non-conductive filter layers disposed on inner and outer peripheries, respectively, of said tube for filtering the liquid,
   a plastic terminal disk having an axial inner surface mounted against axial ends of said support tube and filter layers,
   a metal fastener connected to said terminal disk and projecting therefrom, said fastener including a portion embedded in said terminal disk,
   a metal wire embedded in said terminal disk and including an exposed radial inner end bonded to and electrically connected to said fastener, and a radial outer end exposed at said axial inner surface and electrically connected with an end of said support tube, said wire adapted to conduct static electricity in the liquid from said support tube to said fastener.

8. A filter element adapted for the filtering of a liquid containing static electricity, said filter element comprising:
   a perforated metal support tube,
   inner and outer electrically non-conductive filter layers disposed on inner and outer peripheries, respectively, of said tube for filtering the liquid,
   a plastic terminal disk having an axial inner surface mounted against axial ends of said support tube and filter layers,
   a metal fastener connected to said terminal disk and projecting therefrom,
   a metal wire embedded in said terminal disk and including an exposed radial inner end electrically connected to said fastener, and a radial outer end exposed at said axial inner surface and electrically connected with an end of said support tube, said wire adapted to conduct static electricity in the liquid from said support tube to said fastener, said radial outer end of said wire extending radially at least as far as said end of said support tube.

* * * * *